(12) United States Patent
Bauer (10) Patent No.: US 7,334,555 B2
(45) Date of Patent: Feb. 26, 2008

(54) STAMPED CRANKSHAFT SEAL RETAINER PLATE AND MOLDED ENCODER SENSOR SUPPORT FEATURE

(75) Inventor: Chad David Bauer, Fenton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 37 days.

(21) Appl. No.: 11/046,569

(22) Filed: Jan. 28, 2005

(65) Prior Publication Data

US 2005/0168219 A1  Aug. 4, 2005

Related U.S. Application Data

(60) Provisional application No. 60/541,100, filed on Feb. 2, 2004.

(51) Int. Cl.
*F02F 7/00* (2006.01)
(52) U.S. Cl. ............................................ 123/195 R
(58) Field of Classification Search ............ 123/195 R, 123/195 C, 198 E; 324/207.25; 73/866.5; 277/630, 572
See application file for complete search history.

(56) References Cited

U.S. PATENT DOCUMENTS

| | | | | |
|---|---|---|---|---|
| 4,261,310 A | * | 4/1981 | Laws, Jr. ................ | 123/198 E |
| 4,300,773 A | * | 11/1981 | Jelinek ........................ | 277/630 |
| 4,484,751 A | * | 11/1984 | Deuring ...................... | 277/574 |
| 4,653,458 A | * | 3/1987 | Bergsten ..................... | 123/612 |
| 4,928,980 A | * | 5/1990 | Deuring ...................... | 277/572 |
| 5,131,366 A | * | 7/1992 | Rawlings et al. .......... | 73/118.1 |
| 5,752,213 A | * | 5/1998 | Bryant et al. ............... | 701/111 |
| 5,763,970 A | | 6/1998 | Dunning et al. | |
| 6,250,637 B1 | * | 6/2001 | Oricchio, Jr. ............... | 277/321 |
| 6,420,865 B1 | * | 7/2002 | Rettenmeier ........... | 324/207.25 |
| 6,435,154 B1 | * | 8/2002 | Simpson et al. ........ | 123/195 C |
| 6,865,962 B2 | * | 3/2005 | Gorg et al. ................ | 73/866.5 |

* cited by examiner

*Primary Examiner*—Stephen K. Cronin
*Assistant Examiner*—Hyder Ali
(74) *Attorney, Agent, or Firm*—Harness, Dickey & Pierce, P.L.C.

(57) ABSTRACT

A stamped crankshaft seal retainer plate is provided, including a molded encoder sensor support feature for mounting an encoder sensor of an engine speed sensing system. The use of a stamped crankshaft seal retainer plate reduces the cost of the retainer plate as well as the overall weight of the vehicle while precisely locating the encoder sensor for position and required air gap.

20 Claims, 9 Drawing Sheets

STAMPED CRANKSHAFT SEAL RETAINER PLATE AND MOLDED ENCODER SENSOR SUPPORT FEATURE

CROSS-REFERENCE TO RELATED APPLICATIONS

This application claims the benefit of U.S. Ser. No. 60/541,100, filed Feb. 2, 2004, the disclosure of which is incorporated herein by reference.

FIELD OF THE INVENTION

The present invention relates to crankshaft seal retainer plates, and more particularly, to a stamped crankshaft seal retainer plate with an encoder sensor support feature.

BACKGROUND OF THE INVENTION

Engine speed sensors have typically been incorporated on the camshaft or crankshaft of the engine for providing accurate engine and transmission control. In recent rotational speed sensing systems, active encoder wheels have been mounted to the end of the crankshaft, and an active or passive sensor is mounted in close proximity to the encoder wheel by a crankshaft seal retainer plate that is mounted to the engine block. The crankshaft seal retainer plate is required to be cast with precision in order to ensure that the active sensor is precisely mounted with a predetermined air gap between the sensor and the encoder wheel or tone wheel. The engine speed sensor of this type provides precise speed and position measurement for accurate misfire detection. In the typical system which utilizes a cast crankshaft seal retainer plate to support the sensor, the cast part is heavy, bulky and expensive to manufacture.

SUMMARY OF THE INVENTION

The present invention provides a crankshaft seal retainer including a stamped metal plate having a central aperture extending there through adapted for receiving a crankshaft. A crankshaft seal is mounted in the central aperture and surrounds the crankshaft. A plurality of mounting apertures are spaced around a perimeter of the stamped metal plate. An encoder sensor mounting structure is provided on the stamped metal plate, and the encoder sensor mounting structure is adapted to support an encoder sensor in a predetermined location relative to the central aperture in the stamped metal plate for maintaining a predetermined air gap between the encoder sensor and the encoder wheel or tone wheel when assembled. According to one aspect of the present invention, the encoder sensor mounting structure is made of plastic which is molded to the stamped metal plate.

According to an alternative embodiment, the encoder sensor mounting structure is made of plastic and is mounted to the stamped metal plate by heat staking or otherwise fastening the mounting structure to the stamped metal plate such as by threaded fasteners, rivets or, a snap fit. According to yet another aspect of the present invention, the encoder sensor mounting structure is stamped in the stamped metal plate and the encoder sensor is mounted directly to the stamped encoder sensor mounting structure. According to yet another aspect of the present invention, the encoder sensor mounting structure is formed as a separate stamped metal plate that is attached to a stamped crankshaft seal retainer plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
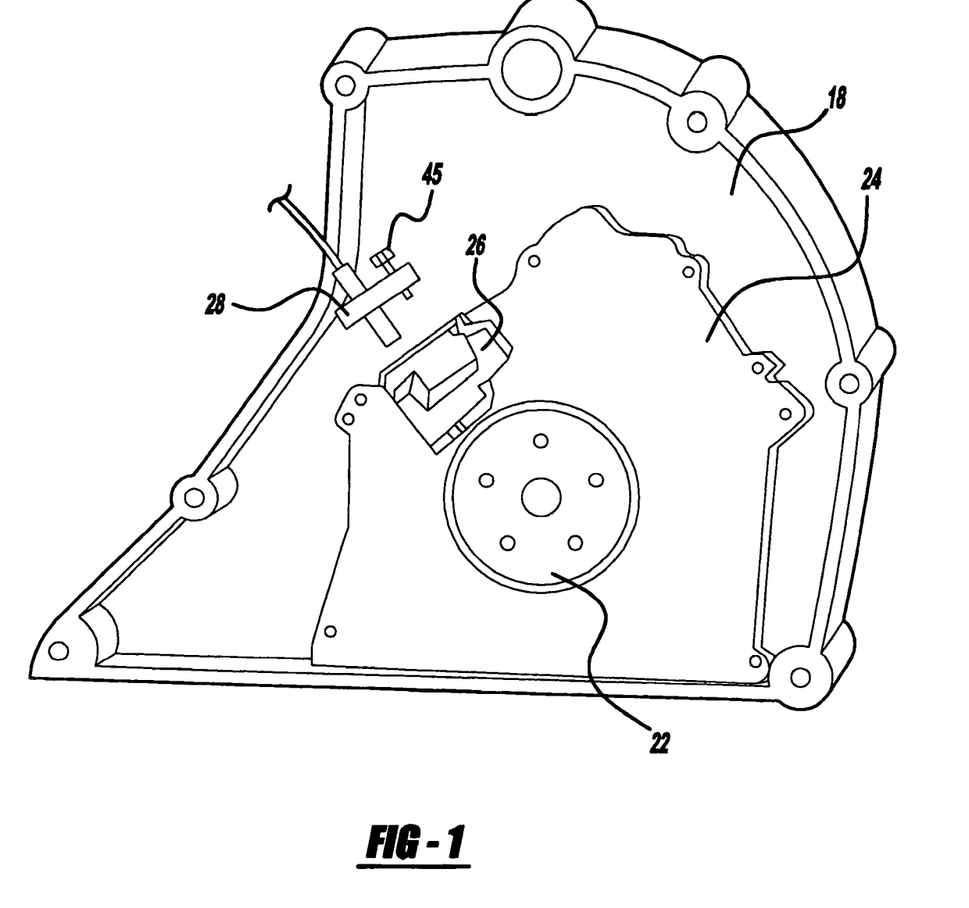
FIG. 1 is a perspective view of a stamped crankshaft seal retainer plate having a molded encoder sensor support feature being mounted to an engine according to the principles of the present invention.
Figure 2:
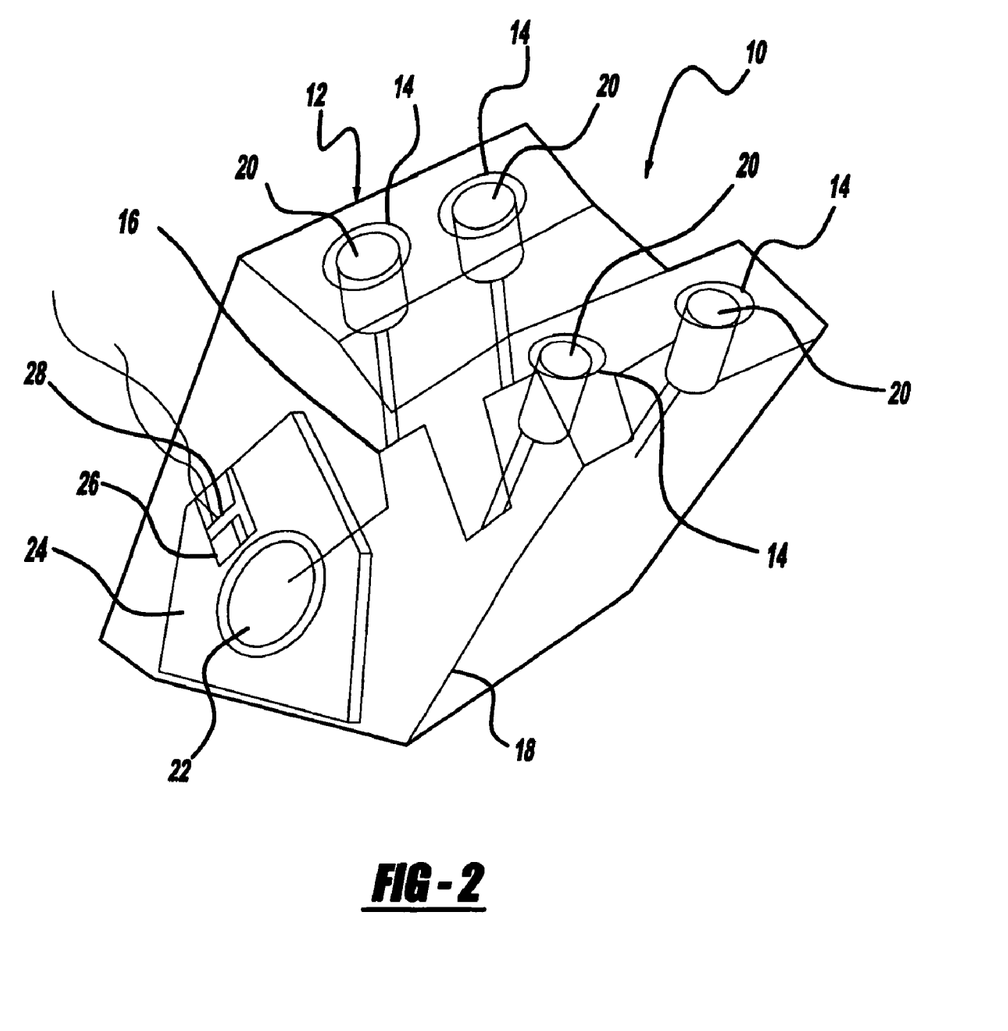
FIG. 2 is a perspective view of an engine incorporating a stamped crankshaft seal retainer plate according to the principles of the present invention.

With reference to FIGS. 1-5, the crankshaft seal retainer plate and molded encoder sensor support feature, according to the principles of the present invention, will now be described. As shown in FIG. 2, an engine 10 is provided with an engine block 12 defining a plurality of cylinders 14. A crankshaft 16 is disposed in a crankcase 18 mounted to the engine block 12. The crankshaft 16 is connected to a plurality of pistons 20, each mounted in a respective cylinder 14 of the engine block 12. As best shown in FIG. 1, an encoder wheel 22 is mounted to the end of the crankshaft 16 and a stamped crankshaft seal retainer plate 24 is mounted to the crank case 18 and surrounding the encoder wheel 22. A molded encoder sensor support feature 26 is molded to the stamped crankshaft seal retainer plate 24 and includes an encoder sensor 28 mounted thereto.

Figure 5:
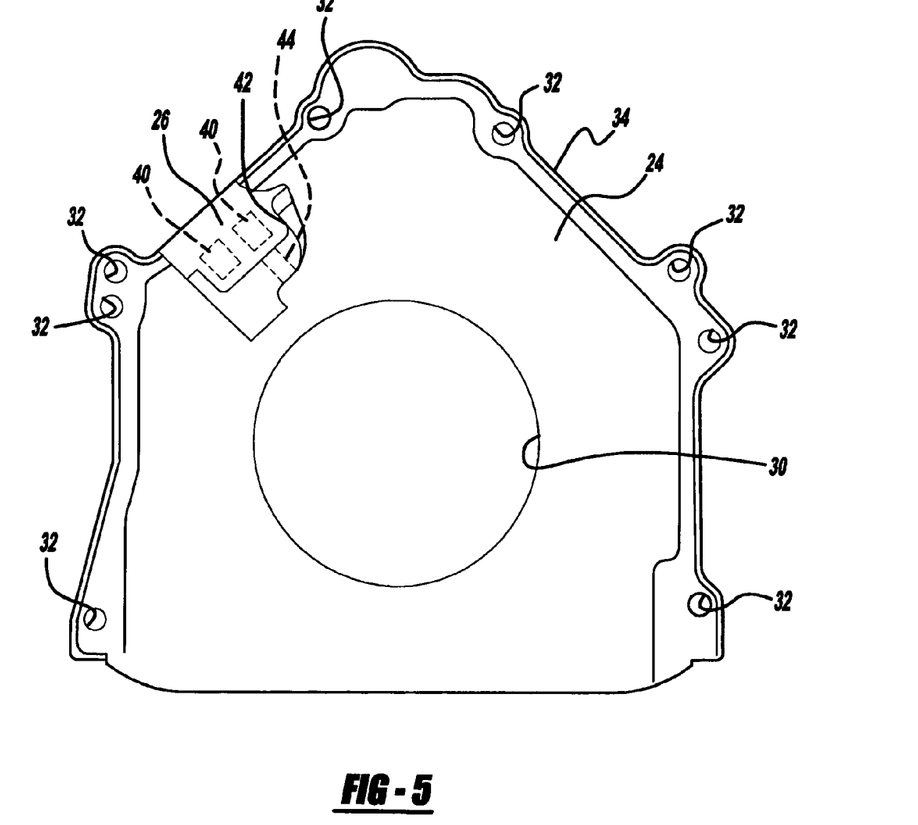
FIG. 5 is a rear plan view of the stamped crankshaft seal retainer plate and molded encoder sensor support feature according to the principles of the present invention.
Figure 6:
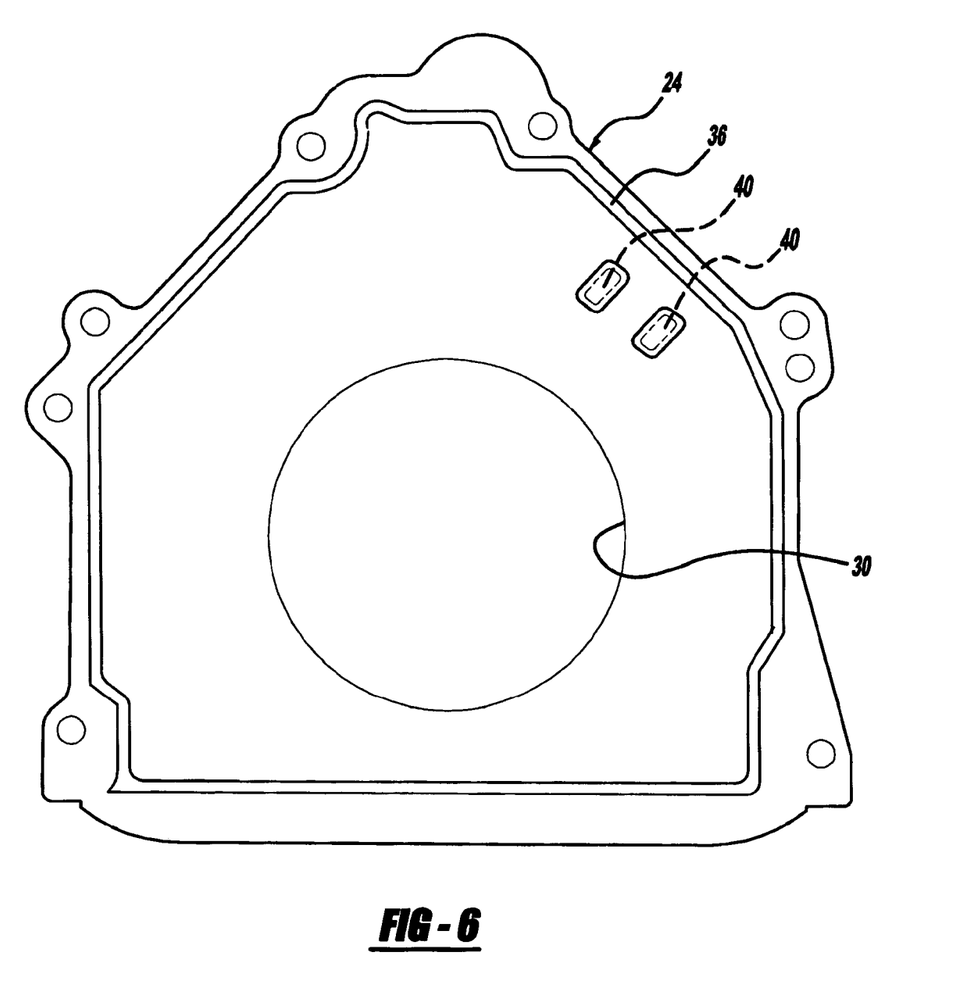
FIG. 6 is a front plan view of the stamped crankshaft seal retainer plate according to the principles of the present invention.

With reference to FIGS. 3-6, the stamped crankshaft seal retainer plate 24 and molded encoder sensor support feature 26 will be described in greater detail. The stamped crankshaft seal retainer plate 24 is stamped from a flat sheet of metal such as steel or other metal and includes a central aperture 30 extending therethrough and adapted for receiving the crankshaft 16. The stamped crankshaft seal retainer plate 24 preferably includes a bent rib structure 33 extending around a perimeter 34 of the plate 24 for providing strength to the plate. A plurality of mounting apertures 32 are spaced around the perimeter 34 of the stamped metal plate 24. A static gasket 36 is molded in place on the rear side of the stamped crankshaft seal retainer plate 24, as illustrated in FIG. 6.

The stamped crankshaft seal retainer plate 24 includes a pair of spaced apertures 40 (illustrated in phantom lines in FIGS. 5 and 6). The encoder sensor mounting support 26 is made from plastic and is molded through the pair of apertures 40 so that the apertures 40 are encapsulated by the molded plastic of the encoder sensor mounting structure 26. The molded encoder sensor mounting support 26 includes a recessed portion 42 for receiving the encoder sensor 28 and includes a threaded bore 44 for receiving a threaded fastener mounted to the sensor for securing the sensor 28 to the molded support feature 26. An aperture 46 extends through the molded support feature 26 for receiving a sensor head 48. The molded support feature 26 is precisely located on the stamped plate 24 so that assembly of the sensor 28 thereto locates the sensor head 48 within a predetermined air gap location relative to the encoder wheel 22.

As is known in the art, the encoder wheel 22 is provided with a plurality of magnetized markers spaced and configured so as to be sensed by the sensor 28 such that the engine controller can specifically determine the wheel speed and crankshaft location, as is known in the art. It should be understood that alternative speed sensing systems, including passive tone wheels and active encoder wheels, can be utilized in combination with the stamped crankshaft seal retainer plate 24 according to the principles of the present invention.

Figure 3:
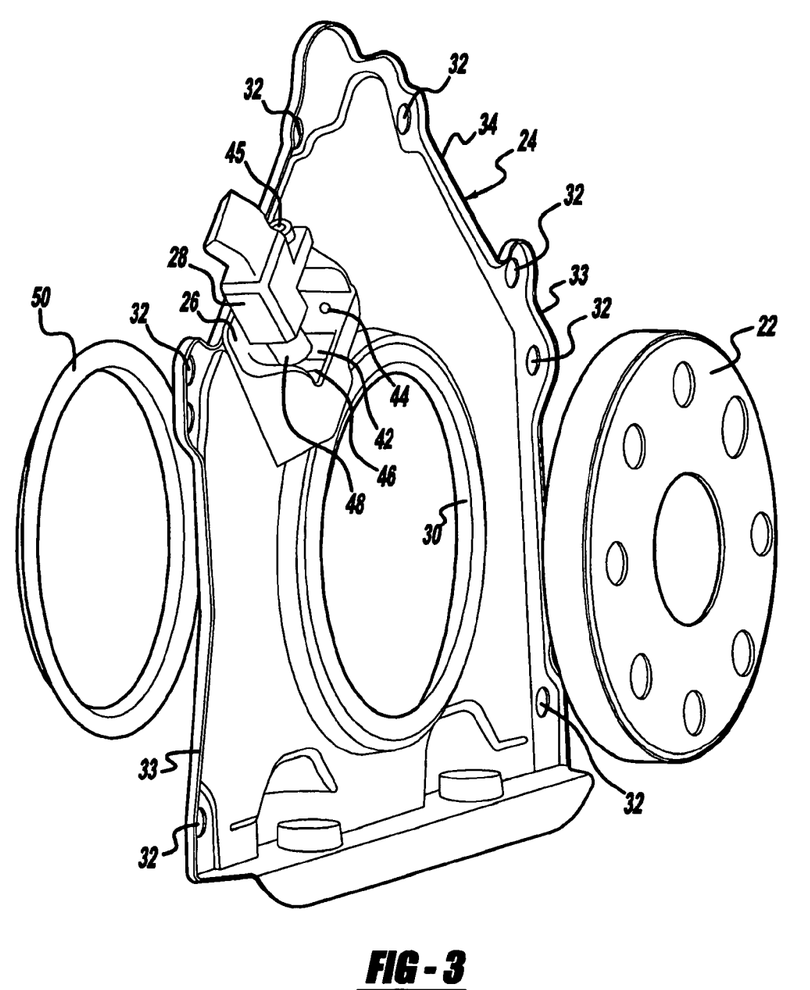
FIG. 3 is an exploded perspective view of the stamped crankshaft seal retainer plate, crankshaft seal, and encoder wheel according to the principles of the present invention.
Figure 4:
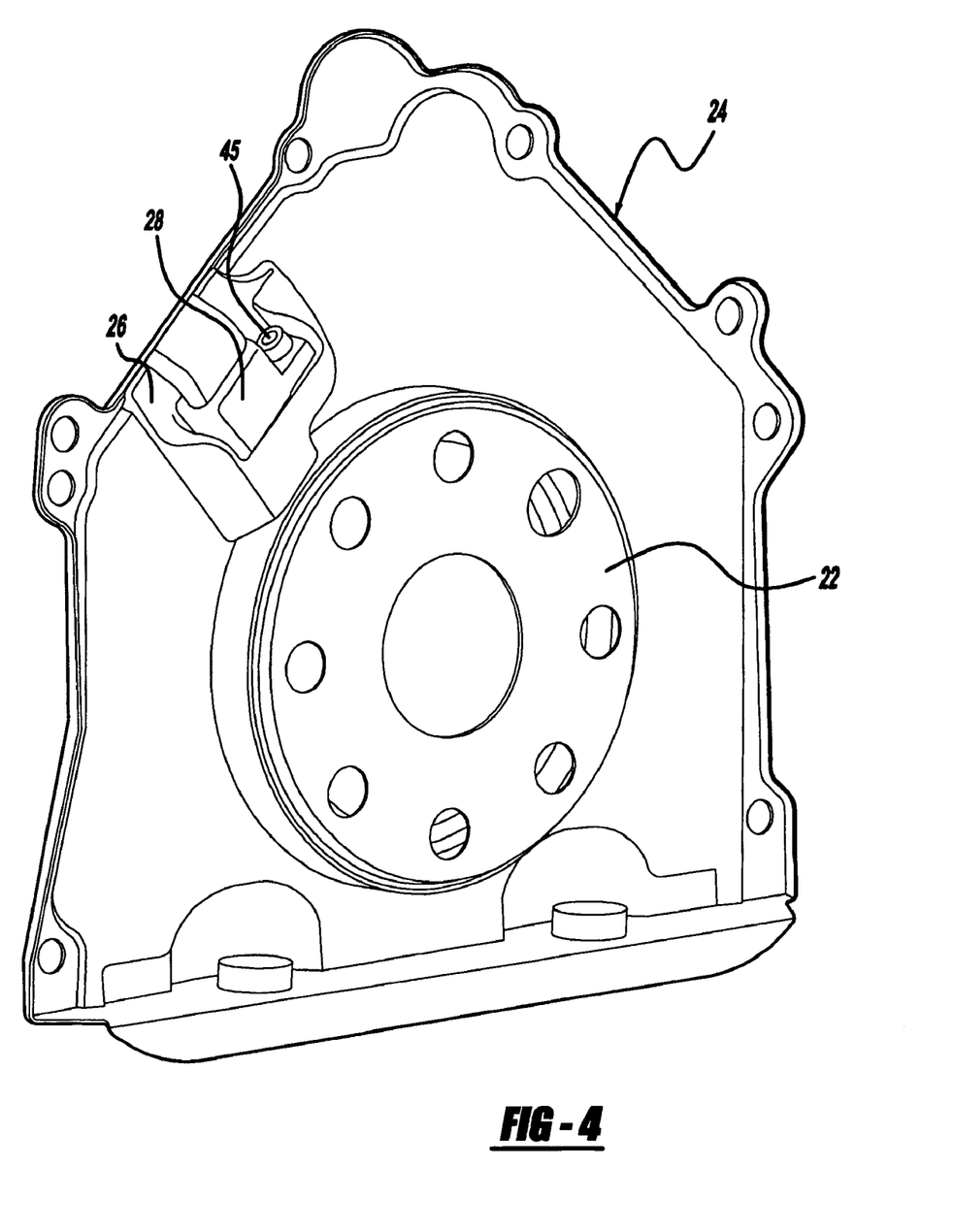
FIG. 4 is a perspective view of the stamped crankshaft seal retainer plate, crankshaft seal, and encoder wheel according to the principles of the present invention.

As shown in FIG. 3, a crankshaft seal 50 engages the aperture 30 in the stamped crankshaft seal retainer plate 24 and is adapted to be disposed around the crankshaft 16 for providing a seal between the retainer plate 24 and the crankshaft 16.

The system of the present invention allows the use of a stamping for the crankshaft seal support and sensor mounting, in a one-piece design while accurately locating the encoder sensor for providing a required air gap. The use of a stamping reduces the cost of the plate as well as providing a reduction in weight.

Figure 7:
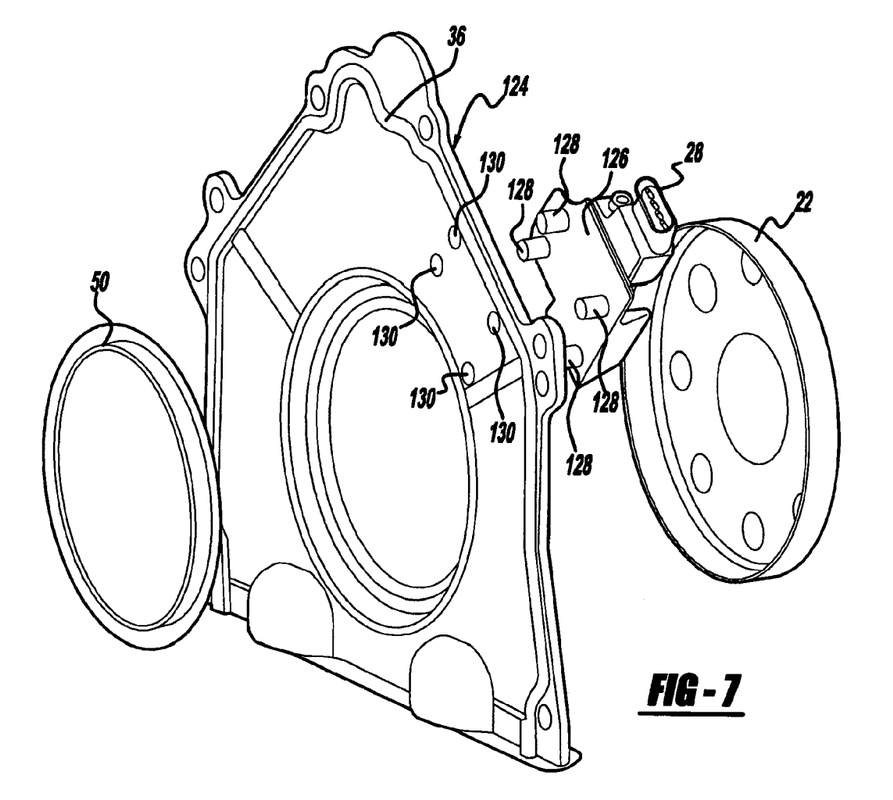
FIG. 7 is an exploded perspective view of a crankshaft seal retainer plate and separately molded encoder sensor support feature according to the principles of the present invention.
Figure 8:
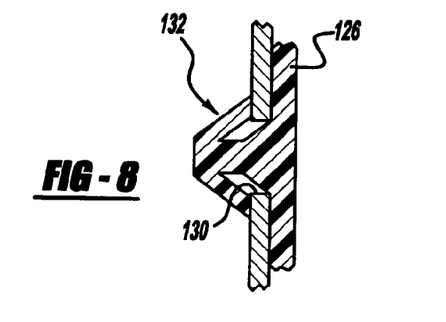
FIG. 8 is a side view of an alternative fastener system for the separately molded encoder sensor support feature according to the principles of the present invention.

With reference to FIG. 7, an alternative embodiment is illustrated including a separately molded encoder sensor mounting support 126 having a plurality of mounting pegs 128 which are received in apertures 130 in stamped crankshaft seal retainer plate 124. After the mounting pegs 128 are inserted in the apertures 130 of the retainer plate 124, the mounting pegs 128 are heat staked for securing the mounting support 126 to the retainer plate 124. Alternatively, as illustrated in FIG. 8, the molded encoder sensor mounting support can be provided with clip type fasteners 132, which upon insertion through apertures 130 in the retainer plate 124 expand outward to secure the mounting support to the retainer plate 124 without any additional processing steps. Furthermore, the mounting support could be mounted to the retainer plate 124 using separate fasteners such as screws, bolts or rivets.

Figure 11:
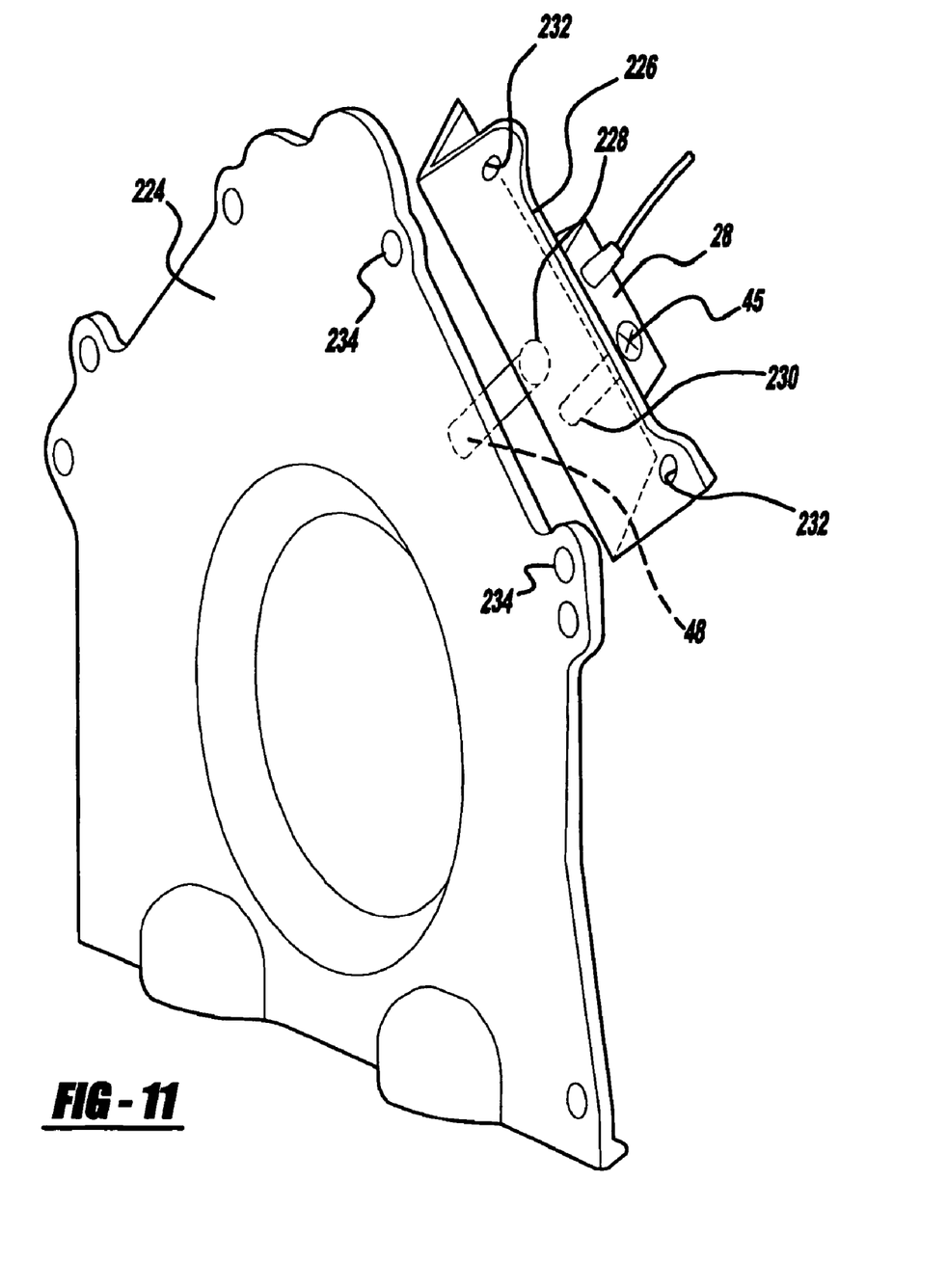
FIG. 11 is an exploded perspective view of a crankshaft seal retainer plate with an encoder sensor support feature stamped into a separate plate that is fastened to the crankshaft seal retainer plate.

With reference to FIG. 11, an alternative embodiment is illustrated including a separately stamped encoder sensor mounting support 226 which is fastened to a stamped crankshaft seal retainer plate 224. The stamped encoder sensor mounting support 226 is stamped from sheet metal and is preferably welded or otherwise fastened to the stamped seal retainer plate 224. The stamped encoder sensor mounting support 226 is shown in FIG. 11 to have a generally L-shaped cross-section but other configurations could also be used as would be understood by one having ordinary skill in the art. The stamped encoder sensor mounting support 226 includes an aperture 228 for receiving a sensor head 48 of an encoder sensor 28 as well as a threaded aperture 230 for receiving a threaded fastener 45 for securing the encoder sensor 28 to the mounting support 226. The stamped encoder sensor mounting support 226 includes mounting apertures 232 which align with mounting apertures 234 in the stamped crankshaft seal retainer plate 224 such that fasteners for the seal retainer plate 224 can also be used to mount the stamped sensor mounting support 226. The stamped encoder sensor mounting support 226 is preferably friction welded or otherwise secured to the stamped crankshaft seal retainer plate 224 prior to assembly to the engine.

Figure 9:
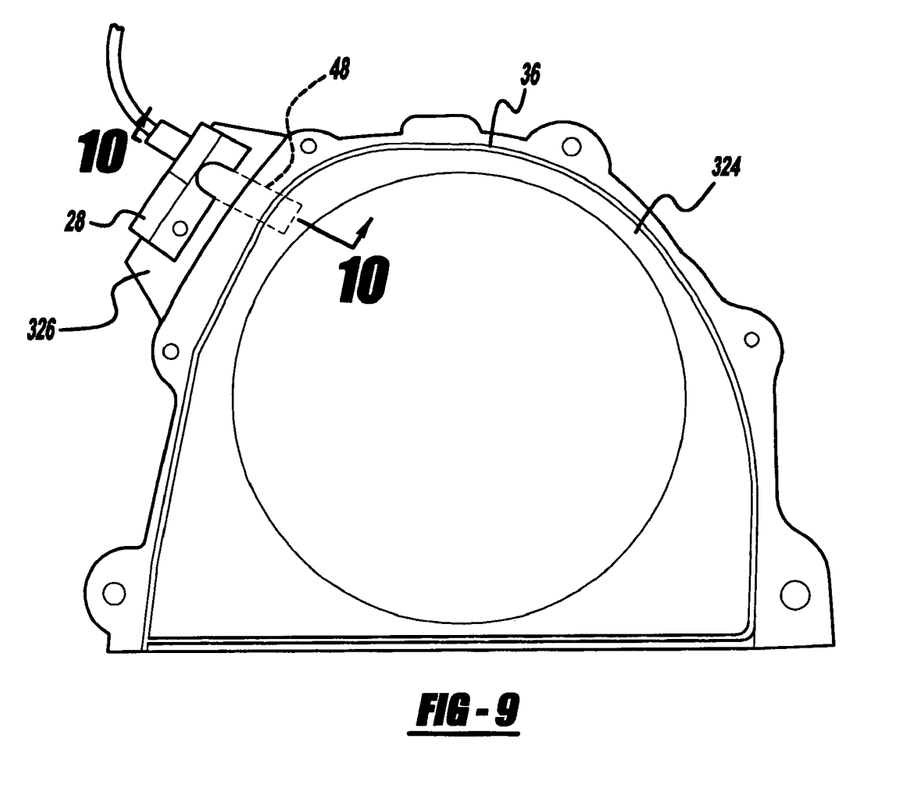
FIG. 9 is a plan view of a crankshaft seal retainer plate with an encoder sensor support feature stamped into the retainer plate according to the principles of the present invention.
Figure 10:
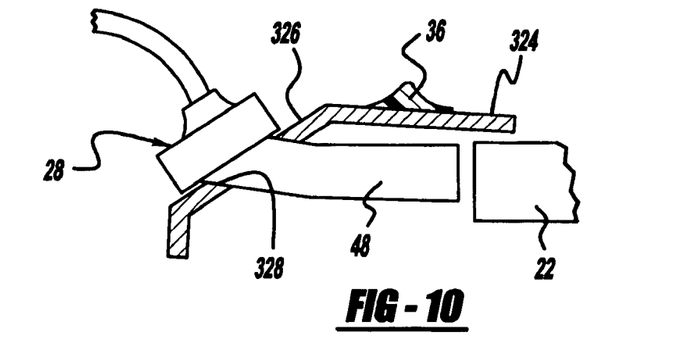
FIG. 10 is a cross-sectional view taken along line 10-10 FIG. 9.

With reference to FIGS. 9 and 10, an alternative embodiment is illustrated including a sensor mounting support feature 326 directly stamped into the stamped crankshaft seal retainer plate 324. As illustrated in the cross sectional view of FIG. 10, the encoder sensor mounting support feature 326 of the stamped crankshaft seal retainer plate 324 is angled relative to the base plate and includes an aperture 328 for receiving a sensor head 48 of an encoder sensor 28 as well as a threaded aperture 330 for receiving a threaded fastener 45 for securing the encoder sensor 28 to the mounting support 326. Preferably, the encoder sensor mounting support feature 326 is angled at between 30 and 90 degrees relative to the base plate. The aperture 328 is preferably oblong to receive the sensor head 48 angularly therethrough as illustrated in FIG. 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seal retainer, comprising:
   a stamped metal plate having a central aperture extending therethrough adapted for receiving a rotatable member, a plurality of mounting apertures spaced around a perimeter of said stamped metal plate, and a first encoder mounting aperture; and
   a plastic encoder sensor mounting structure molded through said first encoder mounting aperture in said stamped metal plate for mounting said encoder sensor mounting structure to said stamped metal plate, said encoder sensor mounting structure being adapted to support an encoder sensor in a predetermined location relative to said central aperture in said stamped metal plate.

2. The seal retainer according to claim 1, further comprising a seal mounted in said central aperture.

3. The seal retainer according to claim 1, further comprising a gasket molded in place around said perimeter of said stamped metal plate.

4. The seal retainer according to claim 1, wherein said plastic encoder sensor mounting structure is molded through a second encoder mounting aperture in said stamped metal plate.

5. The seal retainer according to claim 1, wherein said encoder sensor mounting structure includes an encoder sensor aperture therethrough for receiving an encoder sensor head therethrough.

6. The seal retainer according to claim 1, wherein said encoder sensor mounting structure is formed from a secondary stamped metal plate that is mounted to the stamped metal plate.

7. An engine, comprising:
- an engine block defining a plurality of cylinders therein;
- a crankshaft mounted to said engine block and including a plurality of pistons mounted to said crankshaft and disposed in said plurality of cylinders of said engine block;
- a crankshaft seal disposed around an end portion of said crankshaft;
- a stamped metal crankshaft seal retainer mounted to an end of said engine block and including an aperture in which said crankshaft seal is supported;
- an encoder sensor mounting structure molded to said stamped metal crankshaft seal retainer plate for mounting said encoder sensor mounting structure to said stamped metal plate;
- an encoder sensor mounted to said encoder sensor mounting structure; and
- an encoder wheel mounted to said crankshaft adjacent to said encoder sensor.

8. The engine according to claim 7, wherein said encoder sensor mounting structure is made from plastic.

9. The engine according to claim 8, wherein said plastic encoder sensor mounting structure is molded through an encoder mounting aperture in said stamped metal crankshaft seal retainer plate.

10. The engine according to claim 8, wherein said plastic encoder sensor mounting structure is molded through a plurality of encoder mounting apertures in said stamped metal crankshaft seal retainer plate.

11. The engine according to claim 7, further comprising a gasket molded in place around a perimeter of said stamped metal crankshaft seal retainer plate.

12. A seal retainer, comprising:
- a stamped metal plate having a central aperture extending therethrough adapted for receiving a rotatable member, a plurality of mounting apertures spaced around a perimeter of said stamped metal plate, and an encoder mounting aperture; and
- an encoder sensor mounting structure including at least one mounting peg received in said encoder mounting aperture in said stamped metal plate for mounting said encoder sensor mounting structure to said stamped metal plate, said encoder sensor mounting structure being adapted to support an encoder sensor in a predetermined location relative to said central aperture in said stamped metal plate.

13. The seal retainer according to claim 12, wherein said at least one mounting peg includes at least one clip portion which is snap-fit in said encoder mounting aperture.

14. The seal retainer according to claim 12, further comprising a seal mounted in said central aperture.

15. The seal retainer according to claim 12, further comprising a gasket molded in place around said perimeter of said stamped metal plate.

16. The seal retainer according to claim 12, wherein said encoder sensor mounting structure is made from plastic.

17. The seal retainer according to claim 12, wherein said encoder sensor mounting structure includes an encoder sensor aperture therethrough for receiving an encoder sensor head therethrough.

18. The seal retainer according to claim 12, wherein said at least one mounting peg is heat staked in said encoder mounting aperture.

19. The seal retainer according to claim 12, wherein said at least one mounting peg includes at least one clip portion which is snap-fit in said encoder mounting aperture.

20. The seal retainer according to claim 12, wherein said encoder sensor mounting structure is formed from a secondary stamped metal plate that is mounted to the stamped metal plate.

* * * * *